United States Patent [19]

Angner et al.

[11] 3,925,625

[45] Dec. 9, 1975

[54] TRANSIENT CONTROLLED TELEPHONE LINE CIRCUIT

[75] Inventors: Ronald Joseph Angner, Freehold; Alexander Feiner, Rumson, both of N.J.

[73] Assignee: Bell Telephone Laboratories, Incorporated, Murray Hill, N.J.

[22] Filed: July 25, 1974

[21] Appl. No.: 491,823

[52] U.S. Cl. .............................. 179/99; 179/18 FA

[51] Int. Cl.$^2$ .............................. H04M 1/00

[58] Field of Search ........ 179/99, 18 FA, 81 R, 1 P, 179/18 HB, 170 E, 175.2 B

[56] References Cited

UNITED STATES PATENTS

| | | | |
|---|---|---|---|
| 3,436,488 | 4/1969 | Barbato et al. | 179/99 |
| 3,748,405 | 7/1973 | Saba | 179/99 |
| 3,764,752 | 10/1973 | Yachabach | 179/99 |
| 3,840,710 | 10/1974 | Limiero et al. | 179/99 |

*Primary Examiner*—Thomas A. Robinson
*Attorney, Agent, or Firm*—David H. Tannenbaum

[57] ABSTRACT

There is disclosed a line circuit for use in the path between a switching machine and a telephone station for controlling communication services such as ringing and hold to the station. The line circuit is connected across the communication conduction pairs in a manner which allows removal without interrupting active telephone service. The transient signals which are generated whenever the station makes a transition from on-hook to off-hook and from off-hook to on-hook are used to obviate the need for line current detection. In this manner, the line relay is removed from the series path between the switching machine and the telephone station.

14 Claims, 5 Drawing Figures

FIG. 4

| STATE | RELAY | |
|---|---|---|
| | B | C |
| IDLE | 0 | 0 |
| RING | 0 | 1 |
| BUSY | 1 | 0 |
| HOLD | 1 | 1 |

FIG. 5

| ELEMENT | VALUE |
|---|---|
| R1 | 100Ω |
| R2 | 6.8KΩ |
| R3 | 51KΩ |
| R4 | 1KΩ |
| R5 | 2KΩ |
| R6 | .51MΩ |
| R7 | 5.1MΩ |
| R8 | .1MΩ |
| R9 | 3MΩ |
| R10 | 1.8KΩ |
| R11 | 6.8KΩ |
| R12 | 82KΩ |
| R13 | 22KΩ |
| R14 | 18KΩ |
| R15 | 5.1KΩ |
| R16 | 20KΩ |
| R17 | 10KΩ |
| R18 | 5.6KΩ |
| R19 | 500Ω |
| R20 | 1500Ω |
| R21 | 470Ω |
| R22 | 10KΩ |
| R23 | 500Ω |
| C1 | 1μf |
| C2 | 60μf |
| C3 | .5μf |
| C4 | 1μf |
| C5 | .1μf |

TRANSIENT CONTROLLED TELEPHONE LINE CIRCUIT

FIELD OF THE INVENTION

This invention relates generally to an improved key telephone line circuit and, more particularly, to a key telephone line circuit for use in parallel across the communication leads.

BACKGROUND OF THE INVENTION

The prior art is replete with line circuits designed to control communication services, such as ringing and hold between a switching network and a telephone station. Although many of these circuits have met with commercial success and do indeed provide the service for which they were designed, they all have the limitation that they must be serially inserted in the communication leads between the switching machine and the telephone in order to determine station activity. Such a serial connection is necessary in order to detect whether or not line current is flowing in the network, thereby determining if the station receiver is on-hook or off-hook.

U.S. Pat. No. 3,436,488, issued Apr. 1, 1969 to Robert E. Barbato and David T. Davis, is a typical example of a line circuit where a line relay is used to detect the difference between the hold enable signal and the disconnect signal as generated by the telephone station. Typically, the hold enable signal as seen by the line circuit is a release of the ground on the 'A' lead coupled with the continuation of current flowing over the T and R communication leads between the line circuit and the station network. Such a signal results because the operation of the hold key at the telephone station serves to open the A lead before the network is disconnected. Thus, in prior art line circuits, the release of the A lead causes the connection of a line (L) relay into the communication leads in series between the switching network and the station set for the purpose of detecting the continued flow of current through the line circuit. If the line relay operates indicating a continued flow of current through the station network (off-hook), the line circuit goes into the hold condition and the line relay is maintained operated by current flowing from the switching machine. If, on the other hand, the line relay does not operate (station going from off-hook to on-hook), then the absence of an A lead ground indicates that the station has disconnected and the line circuit goes into the disconnect condition.

One problem with such an arrangement is that, since the line relay winding is in series with one of the communication leads, the voltage to ground from the T communication lead is different from the voltage to ground from the R communication lead when the circuit is in the hold condition and, thus, longitudinal noises are generated. One solution to just such a problem is taught by U.S. Pat. No. 3,840,710, issued Oct. 8, 1974 to Albert D. Limiero and John P. Smith, where balancing resistances are used to compensate for the mismatch. However, such a solution only partially solves the problem and does not compensate for the reactance component of the relay.

Common to the circuits now in use is the concept that the detection of line current is the starting point for control purposes. Thus, a current sensor of some type must be inserted in the communication leads. Such a requirement gives rise to the further requirement that the communication leads must be broken in order to achieve serial current detection. Upon the failure of such a detector, or upon the removal of the line circuit from service, the communication leads are opened and communication is terminated. Accordingly, maintenance on such circuits must await the idle condition of the line.

In addition, using the line circuits currently available, complicated wiring arrangements must be used in order to allow insertion of the circuit serially into the communication path. Such a requirement further reduces the flexibility of such arrangements and does not allow for quick conversion from regular uncontrolled telephone service (no line circuit) to controlled service using a key telephone line control circuit.

Accordingly, a need exists in the art for a key telephone line circuit arranged for the control of communication services between a switching network and a telephone station without requiring the serial connection of the line circuit into the communication path.

A still further need exists in the art for a key telephone line circuit arranged with equal reactance to ground from either lead of the communication lead pair when the circuit is in the hold condition.

It is an object of our invention to provide a key telephone line circuit arranged to facilitate the easy insertion and removal of controlled communication services with respect to a telephone station.

It is a general object of our invention to provide a key telephone line circuit which solves the above-mentioned problems in an economical manner while at the same time reducing the cost of such circuits.

SUMMARY OF THE INVENTION

In furtherance of these objectives, we have designed a telephone line circuit which is connected in parallel across the communication leads from the switching network to the telephone set. The parallel or shunt detector operates to detect ac current flowing for ringing control, while also detecting the transient response of the system caused when the telephone station makes a transition from on-hook to off-hook or from off-hook to on-hook.

Detection of ringing signals is accomplished by allowing the ac current generated by the ringing voltage to pass through and operate the line relay L in much the same manner as in prior line circuits. Operation of the L relay places the line circuit in the ringing condition.

The L relay is capacitive-coupled across the T and R communication leads so that when the line circuit is in the talking or busy condition the L relay is unoperated. When the station makes a transition from off-hook to on-hook, a transient signal is generated and the relay momentarily operates. Since the L relay only operates from the transient signal generated when the station makes such a transition, it can be used in conjunction with the A lead to distinguish between a hold condition and a disconnect signal. Thus, when the A lead ground is removed by operation of the station hold key, the station network temporarily remains across the communication leads; no transient signal is produced; and the L relay remains unoperated. The line circuit is designed to respond to the absence of ground on the A lead and the continued unoperated condition of the L relay by placing the circuit in the hold condition.

In the situation where the subscriber goes on-hook, ground is removed from the A lead and at the same time current is interrupted. The resulting transient momentarily operates the L relay causing the line circuit to respond by placing the circuit in the release or disconnect condition.

Since the L relay is not involved in the detection of line current flowing to the station, as is necessary in the prior art, it may be located in shunt across the T and R communication leads and not in series therewith. Thus, the line circuit can be removed from the circuit and communications can continue over the communication leads between the switching machine and the telephone set with the only reduction in service being the elimination of the lamp signals and the hold capability. Accordingly, the line circuit is fully transparent to both the switching machine and to the telephone station.

The precise manner in which the match between the A lead activity and the L relay operation is achieved is the subject of our copending application R. J. Angner-A. Feiner, Ser. No. 491,822, filed concurrently herewith.

BRIEF DESCRIPTION OF THE DRAWING

The principles of the invention as well as additional objects and features thereof will be fully appreciated from the illustrative embodiment shown in the drawing, in which:

FIG. 4 is a state condition chart showing the condition of the B and C relays for each circuit state; and FIG. 5 is a chart giving typical resistance and capacitance values, which values should not be taken as in any way limiting the scope of the invention.

GENERAL DESCRIPTION

Figure 1:
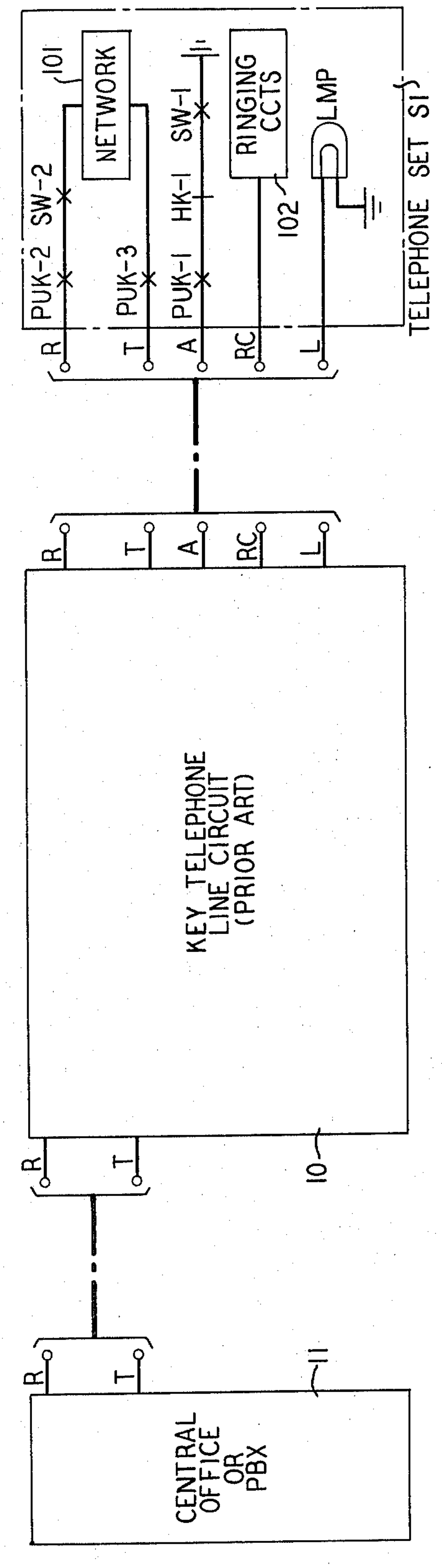
FIG. 1 shows in block diagram form the connection of the prior art key telephone line circuit.

As shown in FIG. 1, prior art key telephone line circuits, such as the circuit disclosed in the aforementioned Barbato et al patent, are inserted in the T and R communication leads between the central office or PBX switching machine 11 and the telephone set S1. Since communication connections are established from the central office or PBX switching machine 11 to the telephone set S1 through the key telephone line circuit 10, removal of that line circuit interrupts all connections to the telephone set. Thus, any removal of the key telephone line circuit for maintenance or other purposes can only take place at times when the telephone set is idle and when such maintenance is being performed the station becomes inoperative.

Figure 2:
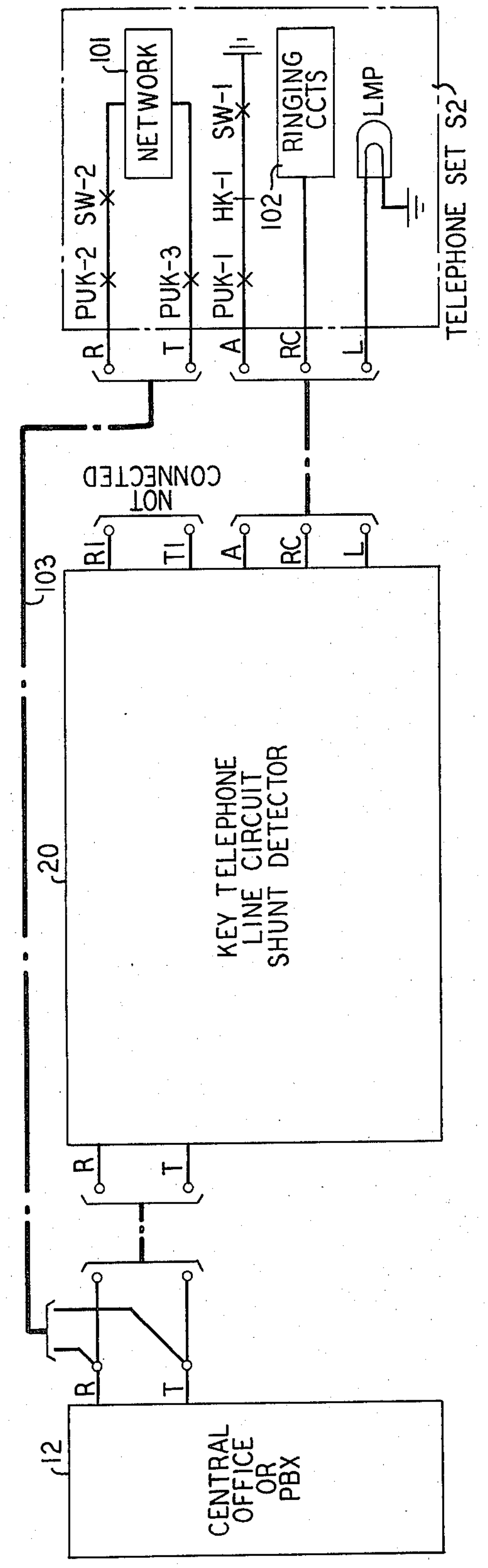
FIG. 2 shows in block diagram form the connection of our new key telephone line circuit.

As shown in FIG. 2, the T and R communication leads which form a communication conductor pair of leads from telephone set S2 can be connected directly, via cable 103, to the T and R communication leads from central office or PBX 12 and, thus, key telephone line circuit shunt detector 20 can be removed from the circuit even during the interval when a communication connection is established to the telephone set without interrupting the established connection. Upon removal of line circuit 20, the hold feature is no longer available to telephone set S2 and lamp signals are unable to be provided. However, assuming the station to be equipped for direct ringing over the T and R leads, as opposed to the bridged ringing connection shown, normal uncontrolled communications can be established or maintained between the central office or PBX 12 and telephone set S2 over the T and R leads. In situations where it is desired to utilize the new key telephone line circuit as a direct replacement for the prior art key telephone line circuit without necessitating wiring changes in the established wiring pattern, telephone set S2 can be connected to the T and R leads extending from the right side of key telephone line circuit 20 and cable 103 can be eliminated. In this arrangement, key telephone line circuit 20 would be a direct replacement for key telephone line circuit 10 in all respects. Under either connection arrangement the circuit operates in a manner to be described more fully hereinafter.

DETAILED DESCRIPTION

Figure 3:
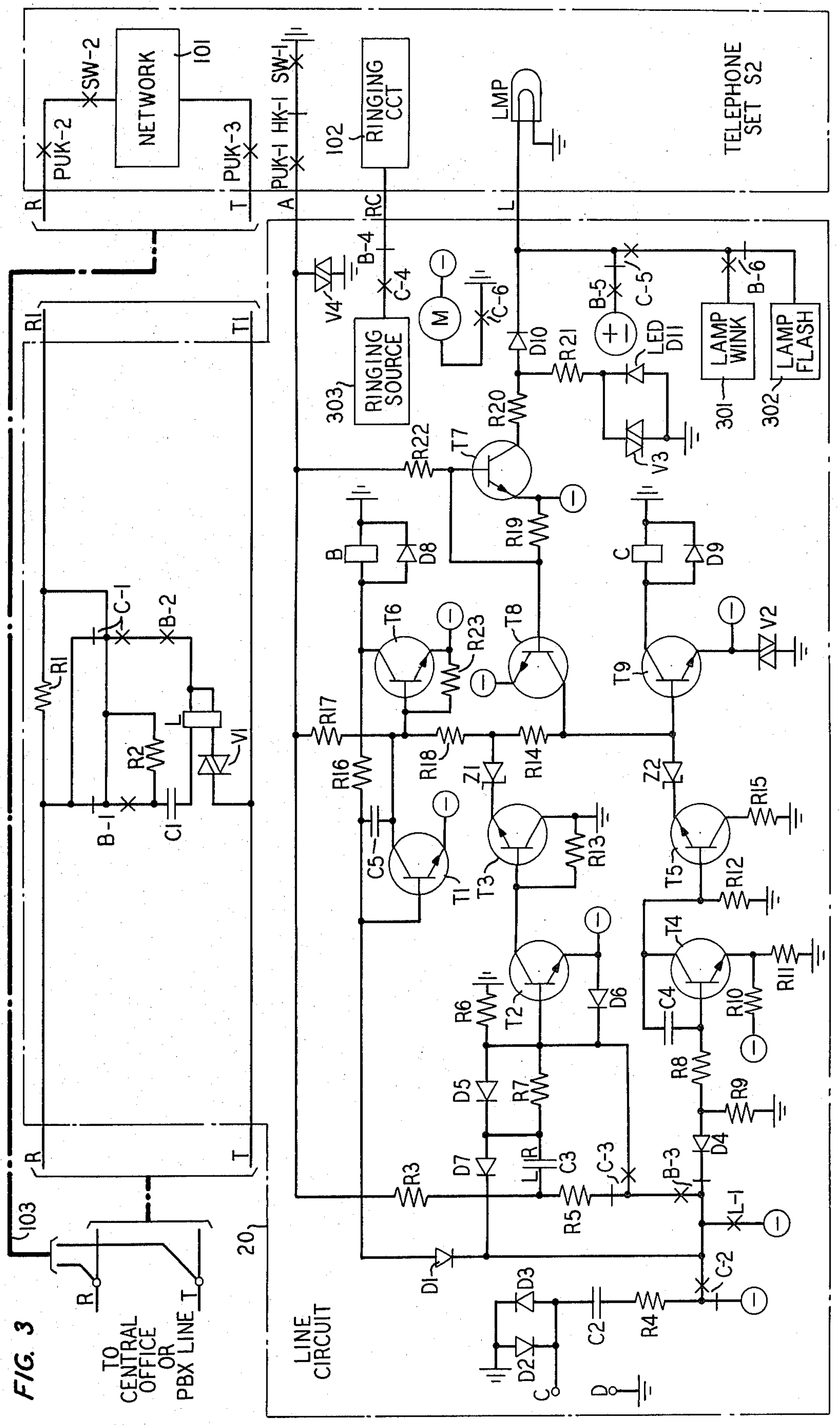
FIG. 3 shows a schematic circuit diagram of the line circuitry in accordance with the invention.

A description of the operation of our invention will be presented in terms of the operation of a line circuit during each significant operating mode and will be presented in accordance with the schematic drawing shown in FIG. 3. The operational modes of the circuit are shown in FIG. 4 where 0 represents the normal or unoperated condition of the associated relay while a 1 represents the operated relay condition.

Circuit Response to Incoming Ringing Signal

When key telephone line circuit 20 shown in FIG. 3 is in the idle condition, relays B and C are both released and all transistors except transistors T1, T2 and T4 are off. Ground from the B relay coil and resistor R16 to the base and battery on the emitter causes transistor T1 to be on. Ground from resistor R6 to the base and battery on the emitter causes transistor T2 to be on. Ground from resistors R9 and R8 to the base and negative potential from resistor divider R10 and R11 on the emitter causes transistor T4 to be on. Transistor T1 is biased in an on condition at this time but no current flows in the collector since the A lead is open.

Operation of the line circuit is initiated by the application of ringing voltage across the T and R communication leads at the central office or other switching point such as a PBX. When ringing voltage is applied, ringing current flows from the R lead of the central office and via break contact B-1 and resistor R2 through capacitor C1, through the series-connected windings of relay L, and through varistor V1 to the T lead from the central office. At this time relay L operates on each cycle of ringing current. When relay L operates, battery is supplied via enabled make contact L-1, released break contact B-3, diode D4 and resistor R8 to the base of transistor T4. Prior to the operation of relay L, capacitor C4 is charged to the collector-base voltage of transistor T4 and, thus, capacitor C4 acts to maintain base drive to transistor T4 for a period of time, preventing transistor T4 from turning off for at least 100 milliseconds after contact L-1 closes. This timing is established to insure that relay L has operated from ringing current supplied and not for some other reason. Thus, capacitor C4 acts to control the initial ring-up timing interval. When capacitor C4 discharges to a point where the base of transistor T4 is no longer positive with respect to the emitter voltage, transistor T4 turns off, removing the negative potential from the base of transistor T5 and thereby causing transistor T5, zener diode Z2 and transistor T9 to turn on via base current to transistor T5 supplied through resistor R12. Transistor T9 turning on provides negative potential to operate relay C.

Relay C operated connects ground to motor M start lead by way of enabled make contact C-6 to start the operation of motor M, a motor typically common to groups of line circuits of the type shown. Motor M controls the operation of lamp wink, lamp flash and ringing source circuits 301, 302 and 303, respectively, to provide pulsating voltage potentials for operating the station lamps and ringing circuits. Accordingly, when relay C operates, lamp flash potential is supplied via released break contact B-6, enabled make contact C-5 and over lead L to operation station S2 lamp LMP in a flashing manner. Additionally, the operation of relay C extends interrupted ringing current from ringing source 303 by way of enabled make contact C-4 and unoperated break contact B-4 and the RC lead to station S2 to operate ringing circuit 102. Conventional wiring options, not shown, may be provided so that steady ringing current may be offered as an alternative; or a ground connection may be made available to operate buzzers or other types of audible indicators.

Time-Out Action of Ringup Circuit

Capacitor C2 is charged to negative potential when the circuit is in the idle state via battery from released break contact C-2 and resistor R4. When relays C and L operate, enabled make contacts L-1 and C-2 continue to supply negative potential to maintain the charge. Capacitor C2 is utilized at this time to bridge the silent interval between ringing signals when the L relay is released. This results since upon the release of relay L during the silent interval between ringing voltage pulses, battery is removed via make contact L-1. However, the negative charge on capacitor C2 supplies negative voltage potential to keep transistor T4 off. Thus, transistors T5 and T9 remain on and relay C remains operated. The time constant for discharging capacitor C2 is controlled by resistors R4 and R9 such that if resistor R9 is selected to be approximately 300 kilohms and capacitor C2 is selected to be 60 mf, relay C will remain operated for approximately 5 to 10 seconds after the release of relay L. If relay L reoperates during this period, capacitor C2 recharges and the circuit remains in the ring state with only relay C operated. If relay L does not reoperate before the voltage level on the base of transistor T4 becomes more positive than the voltage (as provided by the voltage divider of resistors R10 and R11) on the emitter of transistor T4, that transistor turns on, causing transistors T5 and T9 and relay C to go off. The station circuit is then restored to the normal or idle condition.

Answering an Incoming Call — Busy State

An incoming call is answered by operating the conventional pickup key in a telephone set associated with a line being rung and by removing the receiver from the switchhook, thereby placing the station in the off-hook condition. The station or telephone network proper thus makes an on-hook to off-hook transition by becoming connected across the line by way of the operated pickup key contacts and the operated switchhook contact. Ringing is tripped at the central office in the normal manner. At this time ground is also connected through the operated switchhook contact SW-1, released hold key contact HK-1 and operated pickup key contact PUK-1 to the A lead. In all station sets, the ground on the A lead appears before the network is connected across the T and R leads. On disconnect, the network is removed from the T and R leads before the A lead ground is removed. As will be seen, this combination of factors is utilized in the design of our circuit.

The A lead ground is supplied to line circuit 20 over the A lead and via resistor R17 to supply collector current to previously turned on transistor T1, causing current to flow in transistor T1. The base of transistor T1 has ground potential thereon via ground through the coil of relay B and resistor R16. Relay B cannot operate at this point because of the resistance value of resistor R16. Transistor T1 being on provides negative potential on the base of transistor T6 keeping that transistor off. Since ground on the A lead at this time represents the station going off-hook, the network is also connected across the T and R leads via pickup key contacts PUK-2 and PUK-3 and enabled switchhook contact SW-2. If this action occurs, a transient is generated between the T and R leads, which transient causes current to flow between the T and R leads via released break contact B-1, resistor R2, capacitor C1, the series connecting windings of relay L, and varistor V1. This transient current causes momentary operation of the L relay.

The L relay operating supplies battery via enabled make contact L-1 and diode D1 to the base of transistor T1, thereby turning off transistor T1. When transistor T1 turns off, ground from the A lead is directed to the base of transistor T6, causing transistor T6 to turn on, thereby operating relay B. Since ground from the A lead is also extended via resistor R22 to the base of transistor T8, that transistor turns on supplying battery to the base of transistor T9 turning off that transistor, thereby causing relay C to release. Thus, the line circuit is in the busy state with relay B operated and relay C released.

When relay B operates, ringing potential is removed from the station via released break contact B-4 and lamp flash is replaced by a steady signal via enabled make contact B-5 and released break contact C-5.

Varistor V1 insures that there is adequate isolation between the T and R leads when the circuit is in the busy state.

Establishing an Outgoing Call — Busy State

The procedure for making an outgoing call is the same as that for answering an incoming call except that transistor T9 and relay C are off at the time when ground is supplied over the A lead.

Holding Function Control

A busy line can be placed in a hold condition by operating the conventional hold key on the telephone set. When the hold key is depressed, ground is disconnected from the A lead. At this point, without further information, line circuit 20 would be unable to determine whether ground disappeared from the A lead because the hold key was operated or because the station went on-hook. However, in key telephone fashion, when the hold key is operated, ground is removed from the A lead prior to the release of the network from the T and R leads. Thus, by comparing the A lead operation to the T and R lead operation, a determination can be made as to what condition is desired.

Capacitor C3 is used to monitor the operations with respect to the A lead and the L relay. A number of such operations are possible, namely:

a. ground disappears from the A lead, L relay remains unoperated (hold);

b. ground appearing on the A lead with L relay operating momentarily followed immediately by ground disappearing from the A lead (initiation of busy state followed by hold);

c. concurrent disappearance of ground from the A lead and L relay operating (station disconnect); and d. L relay operating followed by ground disappearing from the A lead (station disconnect).

Each of these situations will now be discussed in detail keeping in mind the fact that capacitor C3 is used to control the respective functions. When the L relay operates on the establishment of the busy condition, capacitor C3 is partially charged from negative battery via enabled make contact L-1 and diode D7. After enabled make contact L-1 releases, capacitor C3 continues to charge through resistor R7 and the base-emitter junction of transistor T2. Assuming a negative potential of −24 volts, capacitor C3 charges to a voltage of −23.3 volts due to the 0.7 volt base-emitter drop of transistor T2. Transistor T2 is on from current flowing from ground through resistor R6. Since ground from the A lead is on plate L of capacitor C3, that capacitor is charged to −23.3 volts.

Hold Condition

Ground is removed from the A lead via enabled break hold key contact HK-1 while current continues to flow from the T and R leads to the station. Since relay L is ac-coupled to the T and R leads, that relay remains unoperated. Under such a condition, negative voltage is extended via resistors R19, R22 and R3 to the L plate of capacitor C3. However, since an instantaneous change of voltage across capacitor C3 is not possible current flows through resistor R6 and diode D5 in an attempt to maintain the charge on capacitor C3. Since current is thus no longer available from resistor R6 to drive the base of transistor T2, that transistor turns off. In order to prevent transistor T2 from burning out, diode D6 clamps the voltage at the base of transistor T2 at approximately −24.7 volts. Transistor T2 turning off turns on transistor T3, which latter transistor provides ground via zener diode Z1 to maintain transistor T6 on and to turn on transistor T9 via resistor R14. Relay C thereupon operates. This causes current from the central office to flow through resistor R1, make contacts C-1 and B-2, one coil of relay L and varistor V1 thus causing relay L to operate. Battery is provided via enabled make contacts L-1, B-3 and C-3 to the base of transistor T2 to maintain that transistor off. Since relays B and C are both operated, the line circuit is in the hold condition.

The winding of relay L, resistor R1 and varistor V1 serve as a hold bridge impedance back to the central office and, even though the station network is removed, the communication connection is maintained in an active noncommunicating (hold) condition. At this point, the communication line to the central office is longitudinally balanced to ground, thus eliminating longitudinal voltages which can occur when the impedance on the T lead does not match the impedance on the R lead. When the line circuit is in the hold state with relays B and C operated, lamp wink signals are provided over the L lead via enabled make contacts B-6 and C-5.

Initiation of Busy State Followed Immediately by Hold Signal

As discussed above, as soon as the L relay operates upon the establishment of a connection, either in response to calling signals or because of the initiation by the station, capacitor C3 partially charges very quickly through make contact L-1 as long as that contact is operated. After make contact L-1 releases, capacitor C3 continues to charge at a lower rate through resistor R7. This quick charge, which takes less than approximately 750 ms, is necessary to insure that the circuit will go into the hold condition if immediately upon the establishment of a connection the A lead ground is removed by operation of hold key contact HK-1. Since capacitor C3 charges quickly, if ground is removed and the L relay remains released, transistor T2 turns off as above discussed and the circuit goes into the hold condition in the manner described.

Station Disconnect

When the circuit is in the busy mode and the station goes on-hook, network 101 is removed from the T and R leads causing a transient which momentarily operates relay L. This on-hook condition is controlled by the release of switchhook contact SW-2 or by the release of pickup key contacts PUK-2 and PUK-3. Also at this time, A lead ground is discontinued via released make switchhook contact SW-1 or via released make pickup key contact PUK-1. Relay L operating provides battery via enabled make contacts L-1 and B-3, resistor R5 and released break contact C-3 to the L plate of capacitor C3 thereby quickly removing the charge from that capacitor, which operation, as will be seen, inhibits the enabling of the hold bridge. When the A lead ground is removed, which event occurs concurrently with or after the operation of relay L, capacitor C3 which is now discharged is unavailable to draw current from resistor R6 as it would do if charged. Thus, upon removal of the A lead ground and the operation of relay L, transistor T2 remains on and transistor T3 remains off. Transistor T6 turns off due to the absence of ground on the A lead, thereby releasing relay B. The circuit is thus returned to the idle state with relay L releasing at the end of the transient interval generated by the off-hook to on-hook transition of the station network.

Station Disconnect — Early Transient

In some situations, station network 101 could be removed from the T and R leads substantially before the A lead ground is removed. The L relay would then operate and release while the ground on the A lead is still present. If the circuit were unable to detect such a premature operations of the L relay, the circuit would go into the hold state upon the removal of the A lead ground since at that time there would be no L relay operation to discharge the C3 capacitor and inhibit the hold bridge enable circuit. This situation is protected against by insuring that capacitor C3 recharges slowly after being discharged by the L relay operation. This is accomplished by recharging capacitor C3 through resistor R7. Thus, even if the A lead ground does not disappear for two seconds after the operation and release of the L relay, the circuit remembers the prior L relay operation and goes into the release condition.

Release of the Holding Bridge by a Station

Assume now that the line circuit is in the hold state with relays B and C operated and with transistor T2 being held off by negative potential on its base via enabled make contacts L-1, B-3 and C-3. When any station of the key telephone system seizes the line circuit by operating the associated pickup key and going off-hook, a ground is again extended over the A lead thereby again turning on transistor T8 causing transistor T9 to turn off, releasing relay C. Relay C releasing removes relay L from the T and R leads via now released make contact C-1. Relay C releasing also allows Transistor T2 to turn on via removal of battery from the base of transistor T2 via released make contact C-3. The circuit is thus immediately restored to the busy state with relay B operated via transistor T6 and resistor R17 and with relay C released.

Nonrelease of the Hold Bridge from the Central Office or PBX by Momentary Open Circuit Line Condition As discussed above, when the circuit is in the hold mode, relays B and C are operated and transistor T2 is held off from battery supplied to its base from enabled make contacts L-1, B-3 and C-3. Since relay L is being held operated by loop current flowing in the T and R leads from the central office, when the line current stops flowing relay L releases immediately. The release of relay L serves to remove battery from the base of transistor T2 via now released make contact L-1. However, transistor T2 will remain off until its base becomes 0.7 volt more positive than its emitter. Assuming a connection from terminal D to C, capacitor C2 would have a charge across its plates of –24 volts. Thus, when the L relay releases, the energy stored on capacitor C2 would be discharged via resistor R4, enabled make contacts C-2, B-3 and C-3 to hold transistor T2 off until capacitor C2 discharges 0.7 volt. The discharge rate is controlled by resistor R6, which resistor is selected to give a time delay of 300 milliseconds. If within the 300-millisecond time interval loop current again begins to flow between the T and R leads, relay L reoperates and provides battery via enabled make contact L-1, thereby maintaining transistor T2 off while at the same time recharging capacitor C2.

Release of the Hold Bridge Under Sustained Open Loop Conditions

When the T and R loop is opened for a period of time in excess of the time it takes capacitor C2 to discharge 0.7 volt, transistor T2 turns on thereby turning off transistors T3, T6 and T9, and causing relays B and C to release. The circuit is thus restored to the idle condition.

Immediate Release of Hold Bridge on T and R Lead Open Condition

As discussed above, after the release of relay L on an open loop condition, transistor T2 is held off for the period of time it takes capacitor C2 to discharge 0.7 volt. By removing the ground from terminal C (disconnecting terminals D and C) and by substituting for the ground diodes D2 and D3, capacitor C2 becomes charged to 0.7 volt less negative than if ground were on terminal C. Thus, upon the release of relay L capacitor C2 begins to discharge through resistor R6. However, because the starting voltage across capacitor C2 is the same voltage which will allow transistor T2 to turn on without a time delay, transistor T2 turns on immediately. Thus, as soon as relay L releases, transistor T2 turns on, turning off transistors T3, T6 and T9 and releasing relays B and C. The circuit is thereby restored to the idle state as soon as the T and R current is broken.

Line Circuit Lamp Indications

Light emitting diode LED D11 is provided for the purpose of indicating to a maintenance person the status of the line circuit. Since LED D11 is coupled via diode D10 and resistor R21 to the L lead, LED D11 provides a visual indication of the circuit status as determined by the lamp signals supplied to the station. By also coupling LED D11 via resistors R21 and R20 and via transistor T7 to the A lead, LED D11 provides a visual indication whenever ground is supplied to the A lead. This last-mentioned operation is important since maintenance personnel routinely apply ground potential to the cross-connect terminals for the purpose of physically locating the line circuit. In prior line circuits, this application of A lead ground caused the operation of the A relay and the line circuit was thus located. With the removal of the A relay this is no longer possible and, therefore, the ground on the A lead causes the operation of transistor T7 thereby operating LED D11. Since diode D10 is at this time back biased, the station lamp is not affected. Resistor R20 is added for the purpose of reducing the current flow when LED D11 is operated from transistor T7 to the approximate current flow available when LED D11 is operated from the L lead so that in either situation LED D11 provides similar amounts of light output.

Music on Hold

Resistor R1 is supplied so that music on hold can be provided over the T and R leads. Typically, such music or other signals would be applied via the R and R1 leads. This circuit would operate under such an arrangement.

Lightning Protection

Bidirectional, symmetrical surge detectors V2 and V4 and varistor V3 are used to protect the circuit against voltage surges usually associated with lightning voltage coupling to the line.

It is to be understood that the embodiment described herein is merely illustrative of the principles of the invention. A variety of modifications thereto may be effected by persons skilled in the art without departing from the spirit and scope of the invention.

What is claimed is:

1. A line circuit for use in controlling communication services between a telephone switching machine and a telephone station, said line circuit adapted for connection in parallel across the communication conduction pair between said switching machine and said telephone station and adapted for A-lead control from said station, said line circuit means including hold means operable for maintaining a connection from said switching machine in an active noncommunicating condition, means for detecting signals on said A lead, means for providing transition control signals upon any transition of said telephone station from an off-hook condition to an on-hook condition, said transition control signals being provided in response to the transient signal generated when said telephone station becomes disconnected from said conduction pair, and means for enabling said hold means upon a detected signal from said A lead and the absence of said telephone station transition control signals.

2. The invention set forth in claim 1 further comprising means for signaling the disconnection of said station from said telephone switching machine upon a detected signal from said A lead and the provision of said telephone station transition control signals.

3. The invention set forth in claim 2 wherein said detected A lead signal is the absence of ground potential thereon.

4. The invention set forth in claim 1 wherein said means for providing transition control signals is further operable to detect ringing signals applied to said communication conduction pair from said switching machine.

5. The invention set forth in claim 1 wherein said hold means includes a relay the winding of which is connectable across said communication conduction pair from said switching machine.

6. The invention set forth in claim 1 wherein said means for providing transition control signals is operable to detect ringing signals applied to said communication conduction pair from said switching machine, and operable as a hold bridge for connection across said communication conduction pair from said switching machine.

7. A line circuit adapted for connection in parallel across the communication leads between a switching machine and a telephone station, said line circuit comprising a hold bridge connectable across said communication leads, and means for enabling said hold bridge under control of the joint interaction of transient signals and other signals generated from said station, said enabling means including transient response means operable under control of the transient signal generated when said telephone station makes an off-hook to on-hook transition or an on-hook to off-hook transition, said enabling means additionally including means operable under control of said other signals, said transient response means including a relay having two windings connected in series, said series windings capacitively coupled to said communication leads.

8. The invention set forth in claim 7 wherein said hold bridge is a single winding of said relay, said single winding being directly connected across said communication leads.

9. A line circuit for use in controlling communication connections over communication leads between a telephone switching machine and a telephone station, said line circuit adapted for A-lead control between said line circuit comprising hold means for connection to said communication leads from said switching machine, said hold means operable for maintaining a connection from said switching machine in an active noncommunicating condition, means for monitoring said A lead, station network transition detection means momentarily operable upon station network connection to or disconnection from said communication leads, means for enabling said hold means upon a detected signal on said A lead and the non-operable condition of said station network transition detection means, and means for signaling the disconnection of said station from said switching machine upon a detected signal from said A lead and upon the momentary operation of said station network transition means.

10. The invention set forth in claim 9 wherein said station network transition detection means is connected in parallel across said communication leads between said switching machine and said telephone station.

11. The invention set forth in claim 10 wherein said station network transition detection means is further operable to detect ringing signals applied to said communication leads from said switching machine.

12. The invention set forth in claim 9 wherein said hold bridge includes a connection portion and an impedance portion, and wherein said station network transition detection means includes a detection portion and a communication lead coupling portion, and wherein said detection portion of said station network detection means includes said impedance portion of said hold bridge.

13. The invention set forth in claim 12 wherein said detection portion of said station network transition detection means is a relay.

14. The invention set forth in claim 13 wherein said relay has two windings, said windings being connected together in series, said impedance portion of said hold bridge including one of said windings, and said detection portion of said station network transition detection means includes said series connection of windings.

* * * * *